Patented Jan. 3, 1928.

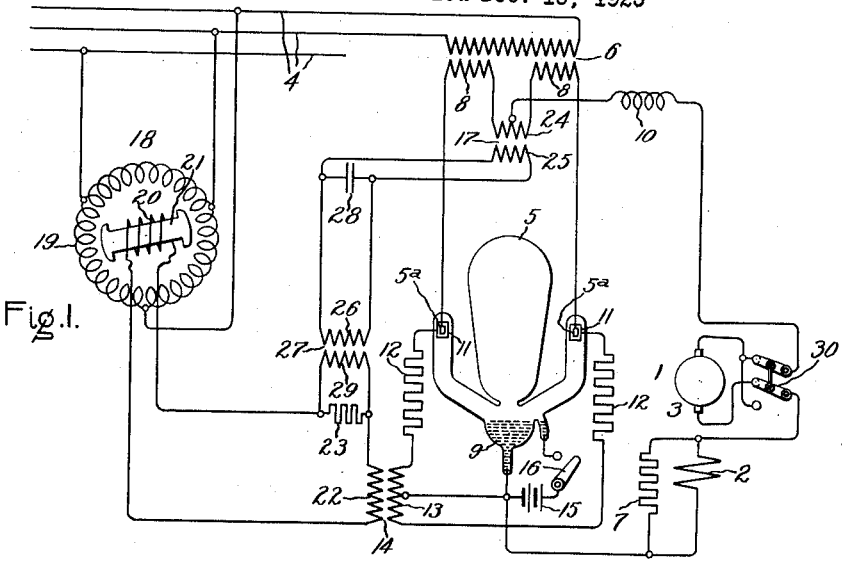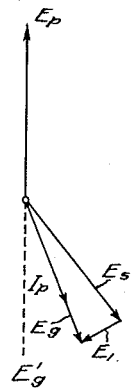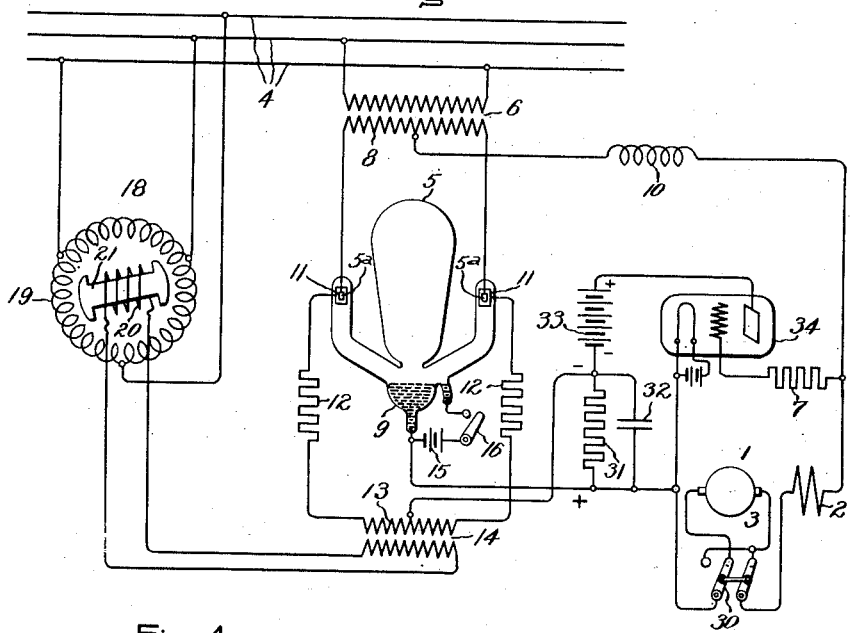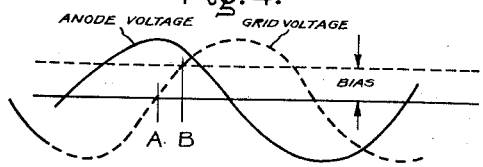

1,655,040

UNITED STATES PATENT OFFICE.

ERNST F. W. ALEXANDERSON AND ALBERT H. MITTAG, OF SCHENECTADY, NEW YORK, ASSIGNORS TO GENERAL ELECTRIC COMPANY, A CORPORATION OF NEW YORK.

CONTROL OF ELECTRIC POWER.

Application filed December 15, 1925. Serial No. 75,577.

Our invention relates to the control of electric power transmitted between direct and alternating current systems, and has for its principal object the provision of an improved apparatus that may be utilized to control and rectify or derectify the current interchanged between such systems. A further object is the provision of an improved apparatus for controlling a series direct current machine connected to a power system and operated either as a motor or generator.

It is desirable that the voltage of an electric machine be varied independently of the voltage of the system to which it is connected in order to control the machine speed both while it is motoring and regenerating. Difficulty in starting to regenerate with a series motor operating at full speed is encountered due to the fact that the machine voltage is zero and no current is transmitted through its field winding at the instant before regeneration is initiated. Under these conditions, starting of the machine current in a direction for regeneration can be produced only by operating the control apparatus in a manner which permits the current suddenly to attain an excessive value when once started. In accordance with our invention, this difficulty is avoided by applying to a control circuit a component voltage which varies in accordance with an electrical condition such as its voltage or current and is adapted to prevent this current from attaining an excessive value.

Our invention will be better understood from the following description when considered in connection with the accompanying drawings and its scope will be pointed out in the appended claims.

Referring to the drawings, Figure 1 shows a control system wherein our invention has been embodied; Fig. 2 is a vector diagram illustrating certain operating characteristics of the apparatus shown by Fig. 1; Fig. 3 shows a different embodiment of the invention; and Fig. 4 illustrates certain operating characteristics of the apparatus shown by Fig. 3.

Fig. 1 shows a series direct current machine 1 provided with field and armature windings 2 and 3 respectively which are connected to current supply means, shown as an alternating current circuit 4, through an electrical valve or vapor electric device 5 and a transformer 6. A resistor 7 is connected to the terminals of the series field winding 2. The vapor electric device 5 comprises anodes $5^a$ which are connected to the terminals of the secondary winding 8 of the transformer 6, a mercury cathode 9 which is connected through the motor 1 and a smoothing reactor 10 to the secondary circuit 8 at a point intermediate its ends, and grids or control electrodes 11 which are interposed between the anodes $5^a$ and the cathode 9 and are connected to the cathode 9 through resistors 12 and the secondary circuit 13 of a transformer 14. The usual battery 15 and switch 16 are provided for initiating operation of the device 5.

A current transformer 17 and a phase control device 18 are provided for controlling the phase of the potential applied to the grids 11. The phase control device 18 comprises a polyphase stator winding 19 that is connected to the alternating current system 4 and a rotor winding 20 wound on a core 21 and connected to the primary circuit 22 of a transformer 14 through a resistor 23. The primary circuit 24 of the transformer 17 is interposed between two sections of the secondary circuit 8 so that it carries the current supplied to the motor 1. The voltage induced in the secondary circuit 25 of the transformer 17 is therefore dependent on the machine load. This voltage is applied to the primary circuit 26 of a transformer 27 through a condenser 28 that is provided for producing a phase difference between the component voltages applied to the grid circuits through the phase control device 18 and the current transformer 17 respectively. The transformer 27 comprises a secondary 29 through which the component voltage produced by the current transformer 17 is applied to the terminals of resistor 23. A switch 30 is provided for reversing the connections of the winding 3 when it is desired to change from motoring to regenerating of the machine 1.

The operation of the apparatus will be readily understood upon consideration of Fig. 2. In this figure, the voltage applied to the anodes $5^a$ is indicated by the vector $E_p$, the component voltage applied to the grid circuit through the phase control device 18 is indicated by the vector $E_s$, the component voltage applied to the grid circuit through the resistor 23 is indicated by the vector $E_1$, the potential applied to the grids is represented by the vector $E_g$, the anode current is indicated by the vector $I_p$ and the line $E'_g$ indicates the phase of the voltage that must be applied to the grids 11 to render the device 5 entirely nonconductive.

When the grid potential is 180 degrees out of phase with that applied to the anodes, no current is transmitted through the valve device 5 and the circuit between the motor 1 and the alternating current circuit 4 is interrupted. The machine 1 is accelerated from rest as a motor by manipulating the phase shifter 18 to advance the phase of the grid potential with respect to that of the anodes, thus gradually increasing the portion of the half cycle during which current can be transmitted to the machine. When the grid potential is in phase with that of the anodes, maximum voltage is applied to the machine and current is transmitted to it during the entire half cycle. Under these conditions the motor is operated at maximum speed.

In order to initiate regeneration with the machine driven at full speed by its load, the phase shifter 18 is operated to bring the potential of grids 11 into phase opposition with that of anodes 5ª thus interrupting the circuit between the machine and its source of current supply; the switch 30 is operated to reverse the armature connections of the machine 1 so that it can transmit current to the line 4 through the vapor electric valve device 5; and the phase shifter 18 is operated to advance the phase of the grid potential with respect to that of the anodes for opening the valve 5 and permitting the transmission of current therethrough to the line 4.

As previously indicated, the machine 1 is likely not to begin operating until the control device 18 has been operated to a position where the generating current of the machine increases very rapidly when it has once started. This excessive increase in current is prevented by the current transformer 17 through which a component voltage $E_1$ proportional in value to the machine current is applied to the grid circuit of the device 5.

The manner in which this result is accomplished will be readily understood if it be assumed that the control device 18 has been operated to a position where the grid potential is represented by the vector $E_g$ before the machine starts to generate current. When the machine begins to operate as a generator, a component voltage $E_1$ is applied to the grid circuit. The effect of this component voltage is immediately to shift the phase of the grid potential back to the position indicated by the vector $E_g$. At the same time the shunt resistor 7 functions to prevent the excitation of the machine from building up at the same rate as its armature current because the rapidly changing current tends to go through the non-inductive resistor. The current of the machine 1 when it begins to operate as a generator is thus automatically maintained within proper limits.

Fig. 3 shows an apparatus wherein this result is accomplished by applying to the grids 11 a negative bias that is dependent on the voltage of the machine. This bias is produced by means comprising an impedance device shown as a resistor 31 which is shunted by a condenser 32 for smoothing out pulsations in the potential drop of the resistor. This potential drop is produced by current supplied from current supply means 33 through an electric valve device 34 to the resistor and is dependent on the current and voltage of the machine 1 for the reason that the machine is connected in the grid circuit of the valve 34.

The manner in which the negative bias control apparatus functions to prevent excessive current when the machine starts to operate as a generator will be explained by reference to Fig. 4. Assuming the phase relation between the grid and anode potentials to be as indicated in this figure, the valve device 5 will tend to open at the instant A if the voltage of the machine 1 is zero. As soon as the machine starts to generate, however, a positive potential is applied to the grid of the device 34, the current transmitted through the resistor 31 from the source 33 is increased and a negative bias proportional in value to the machine voltage and indicated by the broken horizontal line of Fig. 4 is applied to the grid circuit of the valve device 5. The effect of this bias is to change the resultant grid potential so that the valve 5 tends to open at the instant B instead of the instant A and current is supplied to the line 4 during a smaller portion of the half cycle of the anode potential. As in the case of the apparatus shown in Fig. 1, sudden increase in current when the machine starts to operate as a generator is thus controlled in response to the generator current and voltage.

The embodiments of the invention illustrated and described herein have been selected for the purpose of clearly setting forth the principles involved. It will be apparent, however, that the invention is susceptible of being modified to meet the different conditions encountered in its use and we therefore aim to cover by the appended claims all modifications within the true spirit and scope of our invention.

What we claim as new and desire to secure by Letters Patent of the United States, is,—

1. The combination of alternating and direct current power circuits, an electrical valve device comprising a grid for controlling the transmission of current between its cathode and anode and provided with a control circuit for applying a potential to said grid, and means connected between said control and direct current circuits for regulating the phase of said potential in accordance with an electrical condition of said direct current circuit.

2. The combination of alternating and direct current power circuits, an electrical valve device comprising a grid for controlling the transmission of current between its cathode and anode and provided with a control circuit for applying a potential to said grid, and a current transformer connected between said control and direct current circuits for regulating the phase of said potential in accordance with the current of said direct current circuit.

3. The combination of alternating and direct current power circuits, an electrical valve device comprising a grid for controlling the transmission of current between its cathode and anode and provided with a control circuit for applying a potential to said grid, a control device for varying the phase of said potential to control an electrical condition of one of said power circuits, and means operable in accordance with said condition for modifying the effect of said phase control device on said potential.

4. The combination of alternating and direct current power circuits, an electrical valve device comprising a grid for controlling the transmission of current between its cathode and anode and provided with a control circuit for applying a potential to said grid, a control device for varying the phase of said potential to control an electrical condition of one of said power circuits, and means comprising a current transformer connected between said control and direct current circuits for modifying the effect of said phase control device in accordance with the load current of said direct current circuit.

5. The method of regenerative braking in a system wherein a direct current machine and an alternating current circuit are interconnected through means comprising an electrical valve provided with a grid for controlling the transmission of current between its cathode and anode and with a control circuit for applying a potential to said grid, which comprises varying the phase of said potential to control the regenerative current of said machine, and modifying the phase of said potential in accordance with said current for preventing excessive changes in the value of said current.

6. The method of operating a direct current machine connected to an alternating current circuit through means comprising an electrical valve provided with a grid for controlling the transmission of current between its cathode and anode and with a control circuit for applying potential to said grid, which comprises advancing the phase of said potential with respect to that of said anode for accelerating said machine as a motor, retarding the phase of said potential with respect to that of said anode for interrupting the transmission of current through said valve, reversing a connection of said machine, advancing the phase of said potential with respect to that of said anode for causing said machine to operate as a generator, and retarding the phase of said potential with respect to that of said anode in accordance with the current of said machine for preventing excessive increases in the value of said current.

7. The method of regenerative braking in a system wherein a direct current machine and an alternating current circuit are interconnected through means comprising an electrical valve provided with a grid for controlling the transmission of current between its cathode and anode and with a control circuit for applying a potential to said grid, which comprises varying the phase of said potential to control the regenerative current of said machine, and retarding the phase of said potential in accordance with said current for preventing excessive increases in the value of said current.

8. The method of regenerative braking in a system wherein a series direct current machine and an alternating current circuit are interconnected through means comprising an electrical valve provided with a grid for controlling the transmission of current between its cathode and anode and with a control circuit for applying a potential to said grid, which comprises varying the phase of the potential applied to said control circuit in accordance with an electrical condition of said machine.

9. The combination of a power circuit, a machine comprising armature and series field circuits, means for controlling the current transmitted between said machine and said circuit both while motoring and regenerating, and means comprising a current transformer and a condenser operable in response to said curernt for preventing excessive increase in said current when said machine begins to operate as a generator.

10. The combination of a power circuit, a machine comprising armature and series field circuits, means for reversing the connections of said armature circuit, means for controlling the current transmitted between said machine and said circuit both while motoring and regenerating, and means comprising a current transformer and a condenser operable in response to said current for preventing excessive increase in said current when said machine begins to operate as a generator.

11. The combination of two power circuits, an electrical valve device comprising a grid for controlling the transmission of current between its cathode and anode and provided with a control circuit for applying a potential to said grid, and means for modifying the potential of said grid in response to the transmission of power between said power circuits to prevent accumulative changes in the magnitude of the transmitted power.

12. The method of regenerative braking in a system wherein a series direct current machine and an alternating current circuit are interconnected through means comprising an electrical valve provided with a grid for controlling the transmission of current between its cathode and anode and with a control circuit for applying a potential to said grid, which comprises varying the potential of said control circuit in accordance with the regenerative current of said machine.

13. The method of regenerative braking in a system wherein a series direct current machine and an alternating current circuit are interconnected through means comprising an electrical valve provided with a grid for controlling the transmission of current between its cathode and anode and with a control circuit for applying a potential to said grid, which comprises varying the potential of said control circuit in accordance with an electrical condition of said machine.

In witness whereof, we have hereunto set our hands this 12th day of December, 1925.

ERNST F. W. ALEXANDERSON.
ALBERT H. MITTAG.